(12) United States Patent
Anheuer et al.

(10) Patent No.: US 11,081,972 B2
(45) Date of Patent: Aug. 3, 2021

(54) POTENTIAL EQUALIZATION SYSTEM FOR A MODULAR MULTILEVEL CONVERTER

(71) Applicant: SIEMENS ENERGY GLOBAL GMBH & CO. KG, Munich (DE)

(72) Inventors: Mathias Anheuer, Rosstal (DE); Daniel Boehme, Nuremberg (DE); Johannes Dallmeier, Aufhausen (DE); Christopher Eismann, Wendelstein (DE); Johann Holweg, Zirndorf (DE); Martin Kapelke, Nuremberg (DE); Michael Rudek, Nuremberg (DE); Torsten Stoltze, Herzogenaurach (DE); Marcus Wahle, Veitsbronn (DE); Felix Daeumler, Remptendorf (DE); Johannes Griessl, Forchheim (DE); Adrian Huber, Fuerth (DE); Christian Schrammel, Burgthann (DE); Johannes Weber, Erlangen (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 0 days.

(21) Appl. No.: 17/254,471

(22) PCT Filed: Jun. 19, 2018

(86) PCT No.: PCT/EP2018/066230
§ 371 (c)(1),
(2) Date: Dec. 21, 2020

(87) PCT Pub. No.: WO2019/242843
PCT Pub. Date: Dec. 26, 2019

(65) Prior Publication Data
US 2021/0152081 A1   May 20, 2021

(51) Int. Cl.
*H02M 7/483* (2007.01)
*H02M 1/44* (2007.01)

(52) U.S. Cl.
CPC ............ *H02M 7/483* (2013.01); *H02M 1/44* (2013.01); *H02M 2007/4835* (2013.01)

(58) Field of Classification Search
CPC .................. H02M 1/44; H02M 7/483; H02M 2007/4835; H02M 7/003
See application file for complete search history.

(56) References Cited

U.S. PATENT DOCUMENTS 3,567,949 A * 3/1971 Forgotson, Jr. ......... H03M 1/00
                                                              250/556
8,120,888 B2   2/2012  Dorn et al.
(Continued)

FOREIGN PATENT DOCUMENTS

CN    102185266 A    9/2011
EP    3236484 A1    10/2017
(Continued)

*Primary Examiner* — Yusef A Ahmed
(74) *Attorney, Agent, or Firm* — Laurence Greenberg; Werner Stemer; Ralph Locher

(57) ABSTRACT

A potential equalization system for a modular multi-level converter. The converter has a plurality of converter modules and each of the modules has a direct current source. The potential equalization system includes pole contacts, which are each electrically connected to one pole of a direct current source, and at least one electrically conductive contacting element, which can be moved between a first end position in which the contacting element is electrically isolated from the converter modules and a second end position in which the contacting element contacts pole contacts of different direct current sources and can be put on ground potential.

15 Claims, 5 Drawing Sheets

(56) References Cited

U.S. PATENT DOCUMENTS

| | | | |
|---|---|---|---|
| 2006/0124599 A1 | 6/2006 | Braun et al. | |
| 2007/0098419 A1* | 5/2007 | Ashikawa | H02M 1/32 399/37 |
| 2010/0025126 A1* | 2/2010 | Nakatsu | B60L 11/00 180/65.1 |
| 2010/0059245 A1* | 3/2010 | Dorn | H02B 1/16 174/78 |
| 2011/0051371 A1* | 3/2011 | Azuma | H02M 7/003 361/699 |
| 2011/0096575 A1* | 4/2011 | Asplund | H02J 3/36 363/35 |
| 2012/0267955 A1* | 10/2012 | Zhan | H02J 1/06 307/31 |
| 2016/0329176 A1 | 11/2016 | Kipfer | |
| 2017/0025866 A1* | 1/2017 | Goetz | H02J 7/0014 |
| 2017/0129423 A1 | 5/2017 | Sugino | |
| 2018/0043789 A1* | 2/2018 | Goetz | B60L 11/1879 |
| 2018/0069469 A1* | 3/2018 | Gupta | H02J 3/36 |
| 2018/0212530 A1* | 7/2018 | Gotz | H02M 7/49 |
| 2018/0226882 A1* | 8/2018 | Jonsson | H02M 7/219 |
| 2019/0052187 A1* | 2/2019 | Geske | H02M 1/32 |
| 2019/0098777 A1* | 3/2019 | Nakatsu | H05K 7/20927 |
| 2019/0116778 A1* | 4/2019 | Lavin | A01M 21/046 |
| 2019/0280614 A1* | 9/2019 | Koyanagi | H02M 7/48 |
| 2019/0288526 A1* | 9/2019 | Jaensch | H01M 10/46 |
| 2019/0320549 A1* | 10/2019 | Song | H05K 5/0021 |
| 2020/0044580 A1* | 2/2020 | Stankewitz | H02H 7/12 |
| 2020/0053900 A1* | 2/2020 | Feurtado | H05K 7/1432 |
| 2020/0067421 A1* | 2/2020 | Mangold | H02M 7/003 |
| 2020/0161987 A1* | 5/2020 | Gambach | H02M 1/32 |
| 2020/0266725 A1* | 8/2020 | Holmberg | H05K 5/03 |
| 2020/0389084 A1* | 12/2020 | Ergin | H02J 3/36 |

FOREIGN PATENT DOCUMENTS

| | | |
|---|---|---|
| WO | WO 2004093276 A2 | 10/2004 |
| WO | WO 2008074275 A1 | 6/2008 |
| WO | WO 2017088922 A1 | 6/2017 |

\* cited by examiner

POTENTIAL EQUALIZATION SYSTEM FOR A MODULAR MULTILEVEL CONVERTER

BACKGROUND OF THE INVENTION

Field of the Invention

The invention relates to a modular multilevel power converter with a plurality of power converter modules each of which comprises a direct voltage source, for example a capacitor.

In order to perform maintenance work on such a power converter, it is necessary to ensure beforehand that the direct voltage sources are discharged, and that at least one pole of each direct voltage source is at ground potential. The potential connection is, for example, achieved through a large number of sliding contacts connected in series, or through manually inserted bridging cables. However, if two contacts fail the large number of contacts connected in series can lead to interrupting the ground potential.

SUMMARY OF THE INVENTION

The invention is based on the object of providing a potential equalization system for a modular multilevel power converter with a plurality of power converter modules each of which comprises a direct voltage source, which improves the connectability of the direct voltage sources to a ground potential.

The object is achieved according to the invention through a potential equalization system as claimed and a modular multilevel power converter as claimed.

Advantageous elaborations of the invention are the object of the subsidiary claims.

A potential equalization system according to the invention for a modular multilevel power converter that comprises a plurality of power converter modules (3), each with a direct voltage source (13), comprises pole contacts, each of which is electrically connected to one pole of a direct voltage source, and at least one electrically conductive contacting element that is movable between a first end position in which it is electrically disconnected from the power converter modules and a second end position in which it contacts pole contacts of different direct voltage sources and which can be placed at a ground potential, for example by a manual, mechanical or electrical drive.

Thus in a potential equalization system for a modular multilevel power converter according to the invention, poles of direct voltage sources of different power converter modules of the power converter can be placed at a ground potential in that pole contacts, each of which is joined to the poles, are electrically connected to one another by a contacting element, and the contacting element is placed at the ground potential. As a result, in the event of a failure of individual pole contacts, the direct voltage sources that are connected via the other pole contacts to the contacting element remain connected to the ground potential. This advantageously increases the safety of the connection of many direct voltage sources to the ground potential in comparison to a connection through a plurality of contacts connected in series.

One embodiment of the invention provides that at least one contacting element is an electrical shield (i.e., a shielding screen) for shielding a plurality of power converter modules that can be rotated about an axis of rotation between the first end position and the second end position. The electrical shield for example comprises a shielding tube (shield tube) from which at least one shield contact protrudes which, in the second end position of the shield, contacts at least one pole contact, and the axis of rotation of the shield is a longitudinal axis of the shield tube. At least one shield contact is, for example, designed as a handle arranged at the shield tube which, in the second end position of the shield, contacts a plurality of pole contacts. The shield is, for example, manufactured of aluminum.

The elaborations of the invention referred to above make use of a shield of power converter modules, which is a rule is in any case necessary, as a contacting element, or they provide the contacting element with a shielding function. The material and construction effort is thereby advantageously reduced in comparison with separately implemented shields and contacting elements.

A further elaboration of the invention provides that at least one contacting element is an electrically conductive contact cable, for example a copper cable, that can be guided by an electrically insulating guide cable guided via pole contacts of different direct voltage sources, is, in the first end position, not adjacent to any pole contact and is, in the second end position, adjacent to the pole contacts via which the guide cable is guided. The guide cable is, for example, guided by a first cable drum, the contact cable is guided by a second cable drum, and both cable drums are mounted on a drive shaft that can be driven manually, mechanically, or electrically.

A contacting element implemented as a contact cable enables an electrical connection of the pole contacts that can be adjusted flexibly to the spatial distribution of the pole contacts, and also in particular a connection of pole contacts that are spaced relatively far apart from one another.

A modular multilevel power converter according to the invention, in particular a self-commutated modular multilevel power converter, comprises a plurality of power converter modules, each with a direct voltage source which is for example designed as a capacitor or as an electrical interconnection of a plurality of capacitors, and a potential equalization system according to the invention. The advantages of a power converter of this sort result from the advantages referred to above of a potential equalization system according to the invention, and are therefore not described here again.

In a further elaboration of the invention, the power converter comprises a plurality of module groups each of which comprises a plurality of power converter modules, each with at least one pole contact. For each module group, the potential equalization system comprises a contacting element that contacts all the pole contacts of the module group in its second end position. This elaboration of the invention takes into consideration the fact that the power converter modules of a modular multilevel power converter frequently form a plurality of module groups that are, for example, disposed at a spatial distance from one another. In this case it can be advantageous to provide a contacting element for each module group. It can be provided here that all the contacting elements are electrically connected together in their second end positions. This advantageously simplifies the connection to the ground potential. A common drive can furthermore be provided with which all the contacting elements can be driven simultaneously. As a result, the expenditure of costs and material for moving the contact elements can on the one hand be reduced, and the movements of the contacting elements can on the other hand be more easily synchronized.

The above-described properties, features and advantages of this invention, as well as the manner in which these are

DETAILED DESCRIPTION OF THE INVENTION

Parts that correspond to one another are given the same reference signs in the figures.

Figure 1:
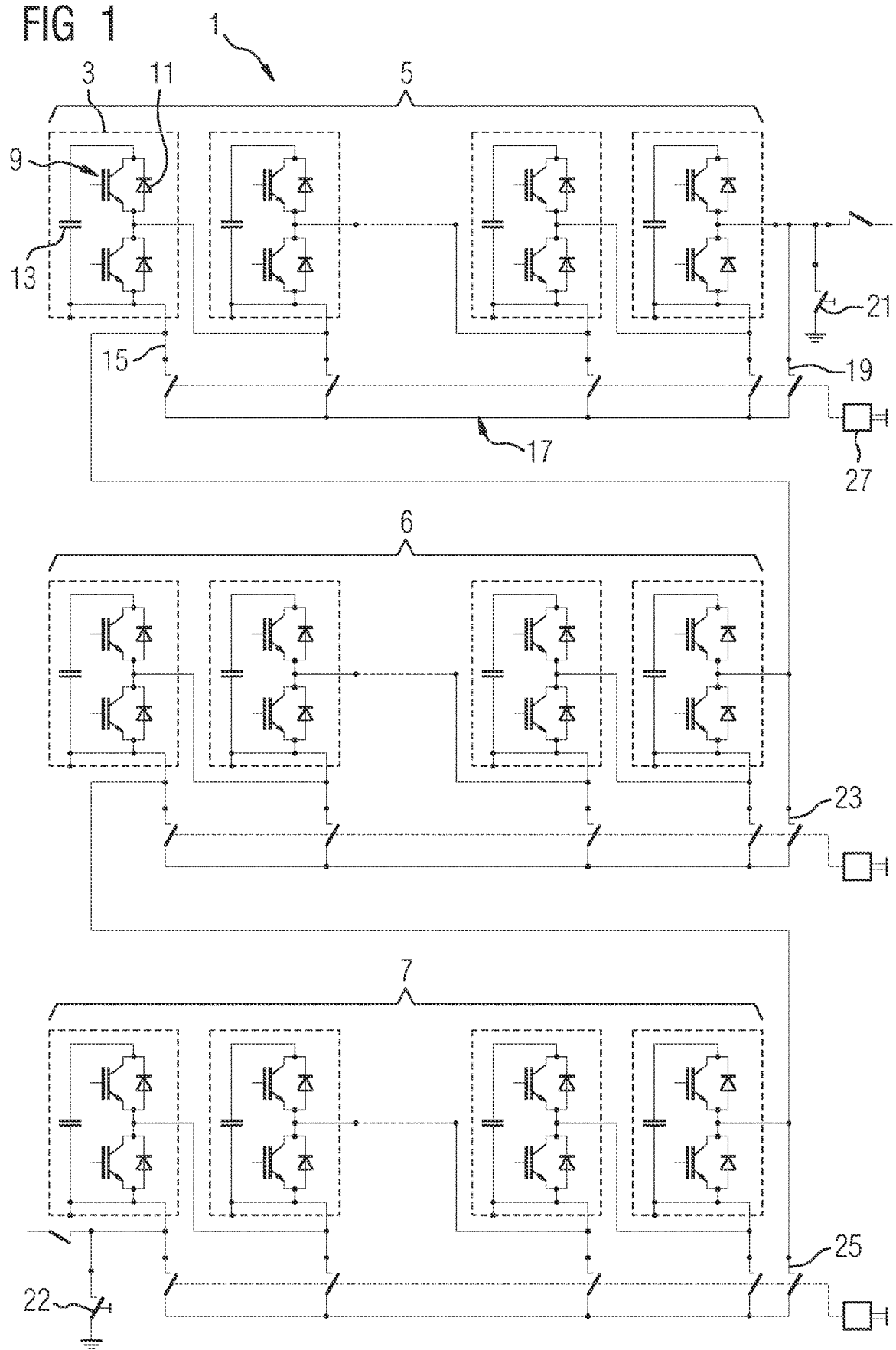
FIG. 1 shows a circuit diagram of a modular multilevel power converter.

FIG. 1 shows a circuit diagram of a self-commutated modular multilevel power converter 1. The power converter 1 comprises a plurality of power converter modules 3 that are connected in series when the power converter 1 is in normal operation, of which only a few are illustrated. The power converter modules 3 form three module groups 5 to 7 arranged one above the other. The power converter 1 further comprises a potential equalization system according to the invention that comprises an electrically conductive contacting element 17 for each module group 5 to 7, and a pole contact 15 for each power converter module 3.

Each power converter module 3 comprises a half-bridge of semiconductor switches 9 each of which is, for example, designed as a bipolar transistor with an insulated gate (IGBT: insulated gate bipolar transistor), with which a freewheeling diode 11 is connected antiparallel. Each power converter module 3 further comprises a direct voltage source 13 that is designed as a capacitor. One pole of the direct voltage source 13 is electrically connected to the pole contact 15 of the power converter module 3, via which the pole can be electrically contacted.

The contacting element 17 of each module group 5 to 7 can be moved between a first end position in which it is electrically disconnected from the power converter modules 3 of the module group 5 to 7, and a second end position, in which it contacts all of the pole contacts 15 of the module group 5 to 7 and connects the direct voltage sources 13 of the power converter modules 3 of the module group 5 to 7 in parallel. The contacting element 17 of a first module group 5 also contacts, in its second end position, a grounding contact 19 to which a ground potential can be applied via a first grounding switch 21. The contacting element 17 of a second module group 6 also contacts, in its second end position, a first connecting contact 23 that is electrically connected to a pole contact 15 of the first module group 5. The contacting element 17 of the third module group 7 also contacts, in its second end position, a second connecting contact 25 that is electrically connected to a pole contact 15 of the second module group 6. The ground potential can be applied via a second grounding switch 22 to a pole contact 15 of the third module group 7. When all of the contacting elements 17 are in their second end position, the ground potential can therefore be applied to all the pole contacts 15 by closing at least one grounding switch 21, 22.

Each contacting element 17 can be moved by a drive 27 between its two end positions. The drives 27 of the contacting elements 17 can also be implemented as a common drive 27 for all contacting elements 17.

Figure 2:
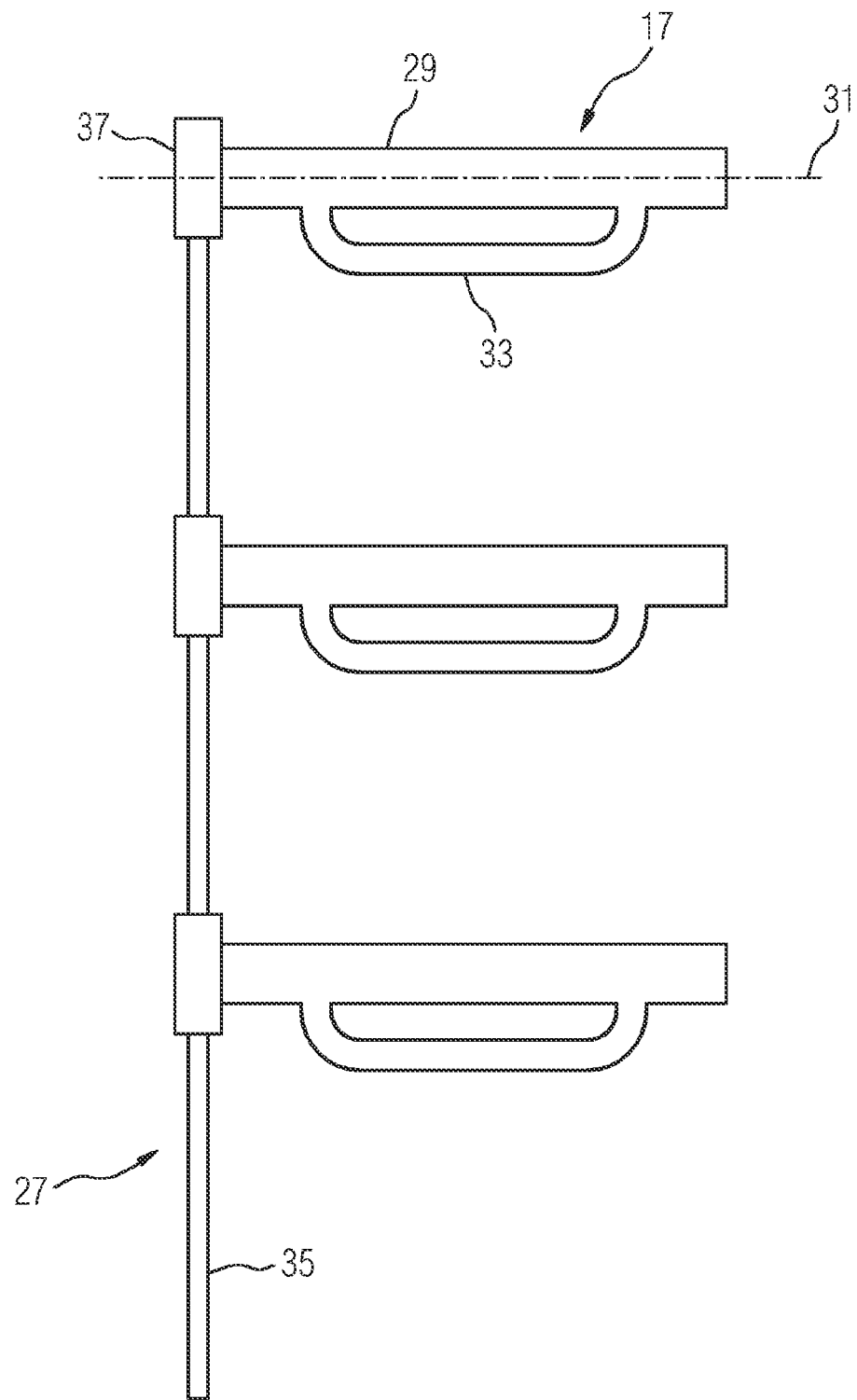
FIG. 2 shows contacting elements designed as shields, and a drive for moving the shields.

FIG. 2 shows contacting elements 17 designed as shields, and a common drive 27 for the contacting elements 17. Each shield is designed to shield the power converter modules 3 of a module group 5 to 7.

Each shield comprises a shield tube 29 and can be rotated between its two end positions about an axis of rotation 31 that is a longitudinal axis of the shield tube 29. A shield contact 33 protrudes from each shield tube 29, and is designed as a handle arranged at the shield tube 29. The shields are manufactured, for example, from aluminum.

The drive 27 comprises a drive bar 35 that can be rotated about its longitudinal axis under manual, mechanical or electrical drive, and for each shield tube 29 a gear element 37 that brings about a rotation of the shield tube 29 about the axis of rotation 31 from a rotation of the drive bar 35 about its longitudinal axis. For example, the drive bar 35 and each gear element 37 form a worm gear, wherein the drive bar 35 is designed as the worm of the worm gear, and the gear element 37 is designed as the worm wheel of the worm gear.

Figure 3:
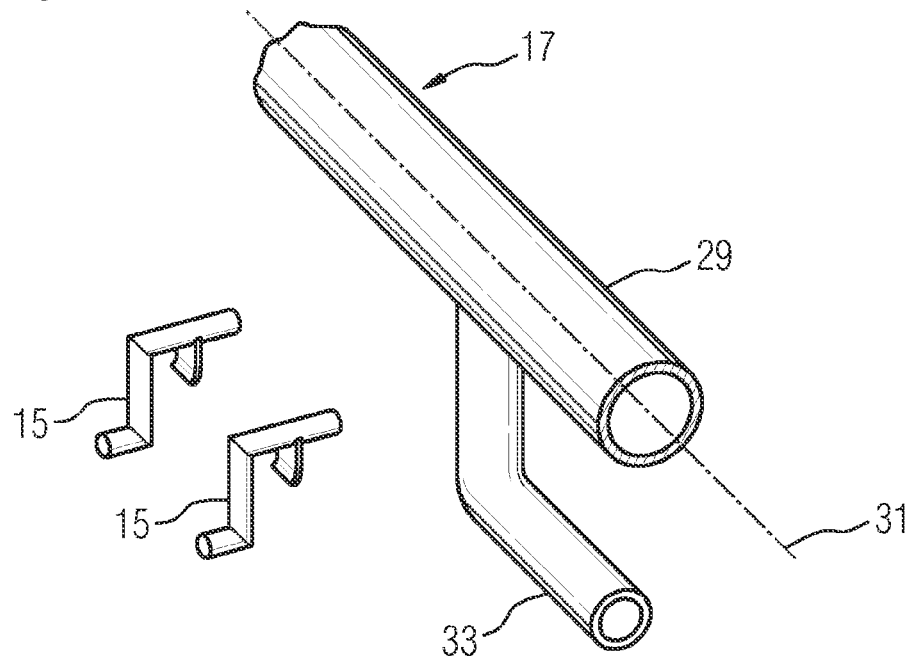
FIG. 3 shows a perspective illustration of pole contacts and a contacting element designed as a shield in a first end position of the shield.
Figure 4:
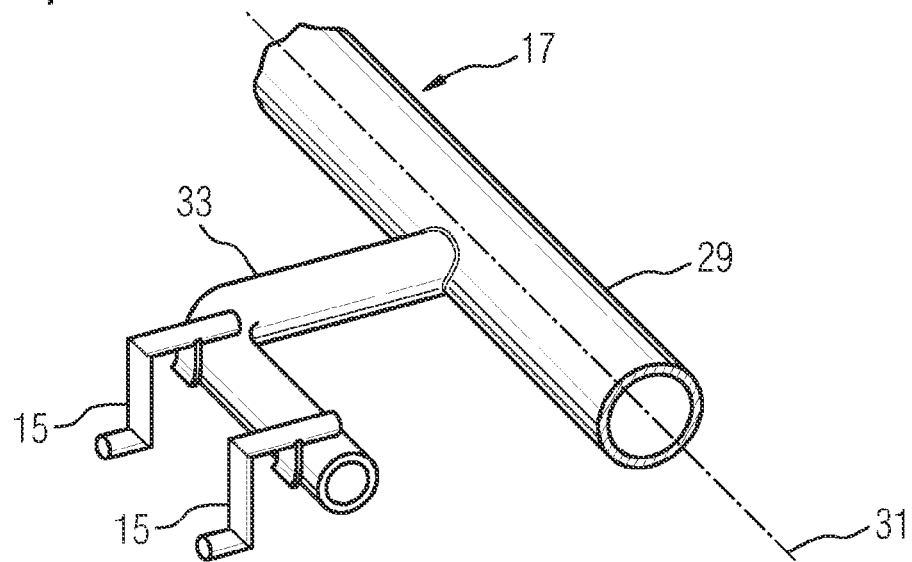
FIG. 4 shows a perspective illustration of the pole contacts shown in FIG. 3 and the shield in a second end position of the shield.

The FIGS. 3 and 4 show two pole contacts 15 of a module group 5 to 7, and a section of a shield that belongs to it in the two end positions of the shield, wherein FIG. 3 shows the first end position and FIG. 4 shows the second end position. The pole contacts 15 of the module group 5 to 7 are arranged next to one another along a line parallel to the axis of rotation 31 of the shield. In the first end position of the shield, the shield contact 33 of the shield is at a position away from the pole contacts 15. In the second end position, the shield tube 29 is rotated through about 90 degrees about the axis of rotation 31 with respect to the first end position, and the shield contact 33 of the shield is adjacent to the pole contacts 15.

Figure 5:
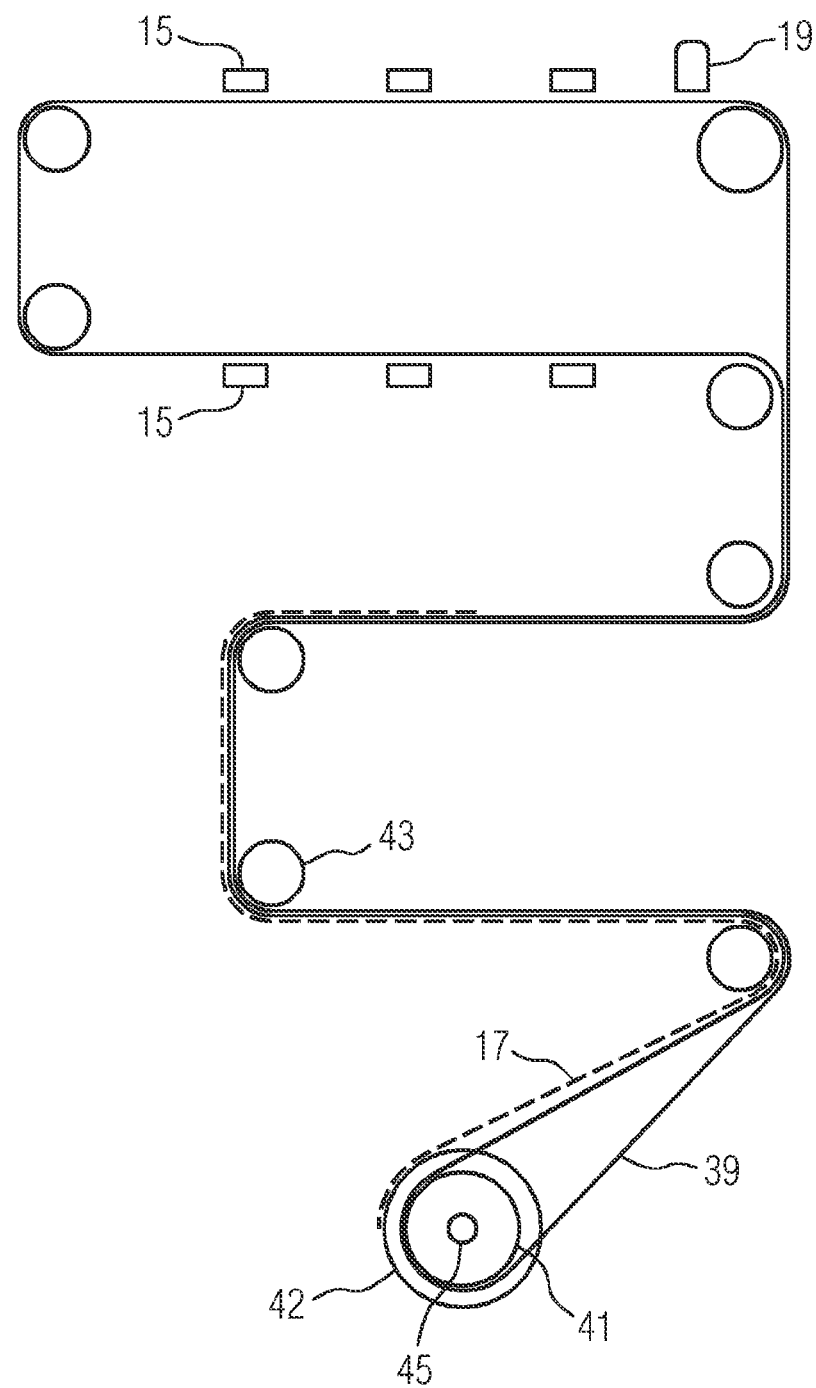
FIG. 5 shows pole contacts and a contacting element designed as a contact cable that is guided at a guide cable in an intermediate position of the contact cable.
Figure 6:
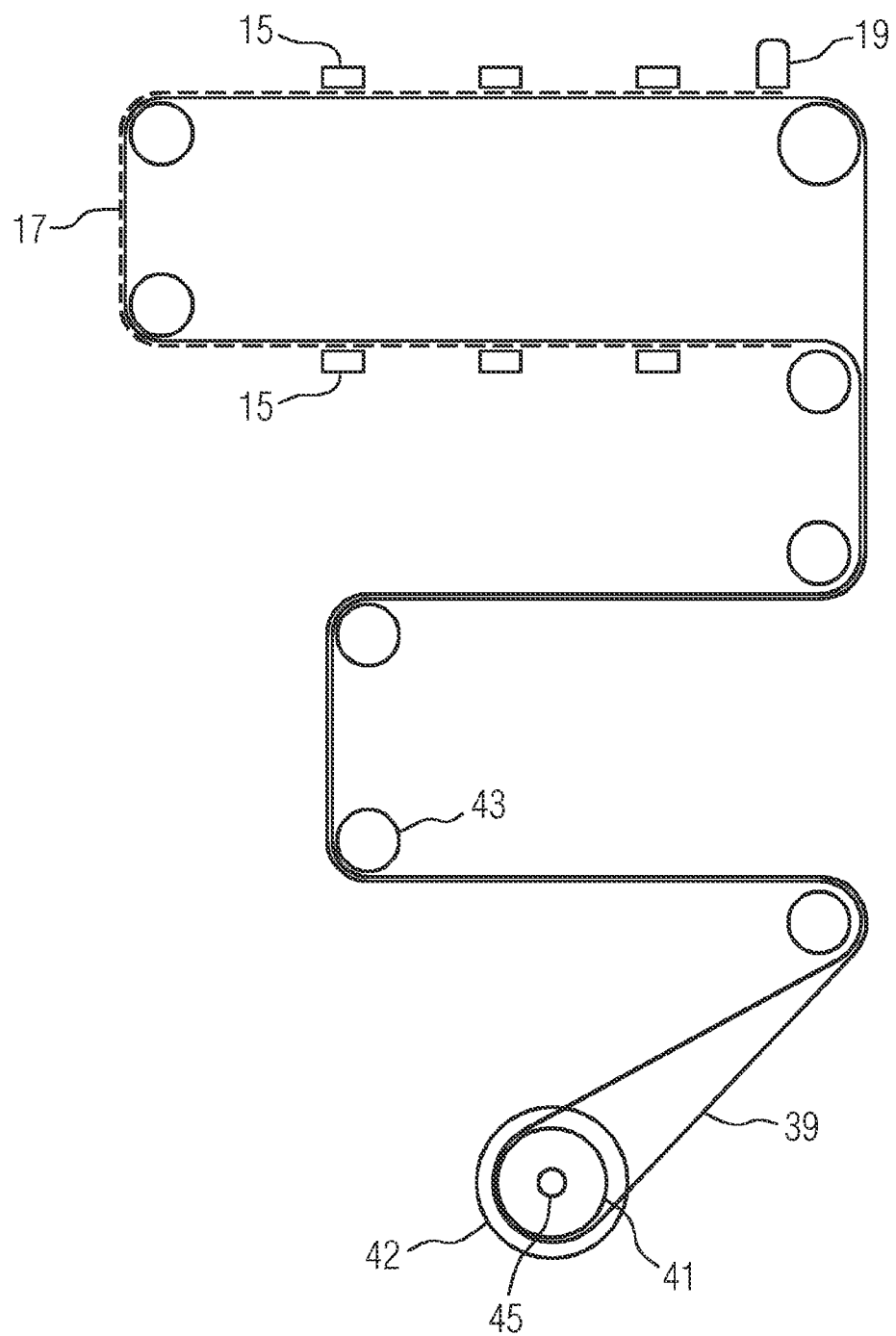
FIG. 6 shows the pole contacts shown in FIG. 5 and the contact cable guided at the guide cable in a second end position of the contact cable.

FIGS. 5 and 6 show pole contacts 15 and a contacting element 17 designed as an electrically conductive contact cable that is guided at an electrically insulating guide cable 39.

The guide cable 39 is guided via a first cable drum 41, deflection rollers 43, the pole contacts 15 and a grounding contact 19.

When in its first end position, the contact cable is wound around a second cable drum 42, and is pulled by the guide cable 39 from the first end position, via an intermediate position shown in FIG. 5, into the second end position shown in FIG. 6, in which it is adjacent to all of the pole contacts 15 and the grounding contact 19. The contact cable is manufactured, for example, from copper.

The cable drums 41, 42 are mounted on a drive shaft 45 that can be driven manually, mechanically or electrically.

Although the invention has been illustrated and described in more detail through preferred exemplary embodiments, the invention is not restricted by the disclosed examples, and other variations can be derived from this by the expert without leaving the protective scope of the invention.

LIST OF REFERENCE SIGNS

1 Power converter
3 Power converter module 5 to 7 Module group
9 Semiconductor switch
11 Freewheeling diode
13 Direct voltage source
15 Pole contact
17 Contacting element
19 Grounding contact
21, 22 Grounding switch
23, 25 Connecting contact
27 Drive
29 Shield tube
31 Axis of rotation
33 Shield contact
35 Drive bar
37 Gear element
39 Guide cable
41, 42 Cable drum
43 Deflection roller
45 Drive shaft

The invention claimed is:

1. A potential equalization system for a modular multilevel power converter, the modular multilevel power converter having a plurality of power converter modules, each with a direct voltage source, the potential equalization system comprising:
a plurality of pole contacts each electrically connected to a pole of a respective direct voltage source; and
at least one, electrically conductive, contacting element rotatably mounted about an axis of rotation between a first end position, in which said at least one contacting element is electrically disconnected from the power converter modules, and a second end position, in which said at least one contacting element connects respective pole contacts of different direct voltage sources and in which said at least one contacting element is connected to ground potential;
said at least one contacting element being an electrical shield for shielding said plurality of power converter modules;
wherein said electrical shield includes a shield tube from which at least one shield contact protrudes which, in the second end position of said electrical shield, connects at least two pole contacts of said plurality of pole contacts, and wherein a longitudinal axis of said shield tube forms the axis of rotation of said electrical shield; and
wherein said at least one shield contact is a handle arranged at said shield tube that connects said at least two pole contacts of said plurality of pole contacts in the second end position of said electrical shield.

2. The potential equalization system according to claim 1, further comprising a drive selected from the group consisting of a manual drive, a mechanical drive, and an electrical drive for moving the at least one contacting element between said first and second end positions.

3. The potential equalization system according to claim 1, wherein said electrical shield is an aluminum shield.

4. The potential equalization system according to claim 1, wherein said at least one contacting element is an electrically conductive contact cable to be guided by an electrically insulating guide cable guided via said pole contacts of different direct voltage sources, wherein said contact cable does not connect any of said pole contacts in the first end position and said contact cable connects said pole contacts in the second end position via which the guide cable is guided.

5. The potential equalization system according to claim 4, wherein said contact cable is a copper cable.

6. The potential equalization system according to claim 4, wherein said guide cable is guided by a first cable drum, said contact cable is guided by a second cable drum, and said first and second cable drums are mounted on a drive shaft to be driven manually, mechanically, or electrically.

7. A modular multilevel power converter, comprising:
a plurality of power converter modules each having a direct voltage source and a pole contact carrying a direct voltage of the direct voltage source; and
a potential equalization system including:
at least one, electrically conductive, contacting element rotatably mounted about an axis of rotation between a first end position, in which said at least one contacting element is electrically disconnected from said power converter modules, and a second end position, in which said at least one contacting element connects said pole contacts of different direct voltage sources of said plurality of power converter modules and in which said at least one contacting element is connected to ground potential;
said at least one contacting element being an electrical shield for shielding said plurality of power converter modules, said electrical shield having a shield tube from which at least one shield contact protrudes which, in the second end position of said electrical shield, connects at least two pole contacts of said pole contacts of said plurality of power converter modules;
wherein a longitudinal axis of said shield tube forms the axis of rotation of said electrical shield; and
wherein said at least one shield contact is a handle arranged at said shield tube that connects said at least two pole contacts of said pole contacts of said plurality of power converter modules in the second end position of said electrical shield.

8. The modular multilevel power converter according to claim 7, wherein each of said direct voltage sources is a capacitor or an electrical interconnection of a plurality of capacitors.

9. The modular multilevel power converter according to claim 7, comprising a plurality of module groups each formed with at least two of said plurality of power converter modules, and wherein each of said at least two of said plurality of power converter modules includes at least one pole contact of said pole contacts, and wherein each of said module groups has a respective contacting element for the respective said module group and which, in the second end position, connects all of said pole contacts of the respective said module group.

10. The modular multilevel power converter according to claim 9, wherein all of said contacting elements of said module groups are electrically connected to one another in the second end positions thereof.

11. The modular multilevel power converter according to claim 9, further comprising a common drive configured for driving all of said contacting elements of said module groups simultaneously.

12. The modular multilevel power converter according to claim 7, configured as a self-commutated power converter.

13. A potential equalization system for a modular multilevel power converter, the modular multilevel power converter having a plurality of power converter modules, each with a direct voltage source, the potential equalization system comprising:
a plurality of pole contacts each electrically connected to a pole of a respective direct voltage source; and at least one, electrically conductive, contacting element rotatably mounted about an axis of rotation between a first end position, in which said at least one contacting element is electrically disconnected from the power converter modules, and a second end position, in which said at least one contacting element connects respective pole contacts of different direct voltage sources and in which said at least one contacting element is connected to ground potential;

said at least one contacting element being an electrical shield for shielding said plurality of power converter modules;

wherein said at least one contacting element is an electrically conductive contact cable to be guided by an electrically insulating guide cable guided via said pole contacts of different direct voltage sources, wherein said contact cable does not connect any of said pole contacts in the first end position and said contact cable connects said pole contacts in the second end position via which the guide cable is guided; and wherein said guide cable is guided by a first cable drum, said contact cable is guided by a second cable drum, and said first and second cable drums are mounted on a drive shaft to be driven manually, mechanically, or electrically.

14. The potential equalization system according to claim 13, wherein said electrical shield comprises a rotatably mounted shield tube from which at least one shield contact protrudes which, in the second end position of said electrical shield, connects at least one pole contact of said plurality of pole contacts, and a longitudinal axis of said shield tube forms the axis of rotation of said electrical shield.

15. The potential equalization system according to claim 14, wherein said at least one shield contact is a handle arranged at said shield tube that connects at least two pole contacts of said plurality of pole contacts in the second end position of said electrical shield.

* * * * *